(12) United States Patent
Lee

(10) Patent No.: US 11,881,124 B2
(45) Date of Patent: Jan. 23, 2024

(54) PORTABLE MULTI-PURPOSE SAFETY TRIANGLE

(71) Applicant: Jin Woo Lee, Seoul (KR)

(72) Inventor: Jin Woo Lee, Seoul (KR)

( * ) Notice: Subject to any disclaimer, the term of this patent is extended or adjusted under 35 U.S.C. 154(b) by 78 days.

(21) Appl. No.: 17/559,141

(22) Filed: Dec. 22, 2021

(65) Prior Publication Data

US 2022/0208034 A1    Jun. 30, 2022

(30) Foreign Application Priority Data

Dec. 24, 2020   (KR) ........................ 10-2020-0183523

(51) Int. Cl.
*G09F 13/16*   (2006.01)
*G08G 1/09*    (2006.01)

(52) U.S. Cl.
CPC .............. *G09F 13/16* (2013.01); *G08G 1/09* (2013.01)

(58) Field of Classification Search
CPC .. G09F 13/16; G08G 1/09; B60Q 7/00; B60Q 7/005; B60Q 1/30; B60Q 2300/43; E01F 9/654; E01F 9/688; B60Y 2304/07
See application file for complete search history.

(56) References Cited

U.S. PATENT DOCUMENTS

| | | | | |
|---|---|---|---|---|
| 3,200,786 A | * | 8/1965 | Swezy ..................... | E01F 9/688 116/63 P |
| 4,490,934 A | * | 1/1985 | Knapp ..................... | G09F 7/00 40/610 |
| 5,540,007 A | * | 7/1996 | Kulp ....................... | E01F 9/688 248/165 |
| D389,078 S | * | 1/1998 | Freeman .................. | D10/113.2 |
| 5,924,228 A | * | 7/1999 | Yang ........................ | G09F 7/20 40/607.1 |
| 6,389,721 B1 | * | 5/2002 | Yang .................. | G09F 15/0062 116/63 T |
| 7,941,952 B1 | * | 5/2011 | Corbean ............ | G09F 15/0062 116/63 P |
| 8,393,482 B2 | * | 3/2013 | Durham .................. | D06F 59/02 248/163.1 |
| 9,242,600 B2 | * | 1/2016 | Al Shalabi ............... | B60Q 7/00 |
| 9,601,012 B2 | * | 3/2017 | Williams ................. | G08G 1/07 |

(Continued)

FOREIGN PATENT DOCUMENTS

EP           0352386 A1 *  1/1990

*Primary Examiner* — John Fitzgerald
*Assistant Examiner* — Tania Courson
(74) *Attorney, Agent, or Firm* — Maier & Maier, PPLC

(57) ABSTRACT

A portable multi-purpose safety triangle includes: a tripod including: a sign unit; and a support unit which supports the sign unit and is configured to be selectively set in one of a folded state and an unfolded state; and a frame including: a frame body having an accommodation space for accommodating the tripod therein; and a frame cap selectively coupled to the frame body. The support unit includes: a first assistant support and a second assistant support that support the sign unit; an elastic member whose both ends are respectively connected to the first assistant support and the second assistant support, the elastic member providing a restoring force to the first assistant support and the second assistant support; and a main support that supports the elastic member. The sign unit includes a flexible material such that the size thereof is changed according to the state of the support unit.

8 Claims, 14 Drawing Sheets

(56) References Cited

U.S. PATENT DOCUMENTS

| | | | |
|---|---|---|---|
| 9,718,401 B2* | 8/2017 | Kim | B60Q 7/00 |
| 10,994,652 B2* | 5/2021 | Kim | B60Q 1/2615 |
| 11,242,002 B2* | 2/2022 | Wang | E01F 9/654 |
| 2008/0129543 A1* | 6/2008 | Lee | G08G 1/0955 |
| | | | 340/908 |
| 2015/0083678 A1* | 3/2015 | Baughman | A47F 5/04 |
| | | | 211/85.3 |
| 2021/0023989 A1* | 1/2021 | Tsai | B60Q 7/005 |

* cited by examiner

PORTABLE MULTI-PURPOSE SAFETY TRIANGLE

CROSS-REFERENCE TO RELATED APPLICATION

This application claims priority to Korean Patent Application No. 2020-0183523 filed on Dec. 24, 2020, the entire contents of which are incorporated herein by reference.

TECHNICAL FIELD

The present disclosure relates to a portable multi-purpose safety triangle.

BACKGROUND

In general, when a vehicle breaks down or an emergency occurs during driving, a driver stops the vehicle on the road. Further, when a driver suddenly stops a vehicle on a road, it is required to show the following vehicles that the vehicle is stopped in order to avoid accidents with the following vehicles. To this end, the driver sets up a safety triangle on the road so that the following vehicles can recognize the stopped vehicle in advance and avoid damage.

However, the safety triangles of the related art are not seen well from afar even though they are set up on a road, and become obstacles on the road and cause accidents. Further, a secondary accident occurs due to the following vehicles while a driver goes to set up a safety triangle in some cases. In particular, such accidents occur frequently at night when drivers have difficulty in securing a visual field.

Further, the safety triangles of the related art are manufactured in a large size to be easily recognized by the drivers of vehicles driven at a distance. Since safety triangles have quite a bit of weight and volume, it is inconvenient for users to carry or stow them. Further, the preparation ratio of safety triangles is low and safety triangles are usually kept in the trunk of a vehicle, so it is dangerous for a user to set up a safety triangle in an emergency. Accordingly, there is a need for a safety triangle that can be easily recognized by drivers who are driving on a road, that can be safely and easily set up by a driver, and that can be stowed around a driver.

SUMMARY

An embodiment of the present disclosure has been designed in consideration of the background described above and provides a portable multi-purpose safety triangle that can be prepared adjacent to a driver seat, so it can be safely and easily set up by a driver.

Further, an embodiment of the present disclosure provides a small-sized portable multi-purpose safety triangle that a user can easily carry or stow.

Further, an embodiment of the present disclosure provides a portable multi-purpose safety triangle that can provide various functions and can increase a preparation ratio in a vehicle for a driver by being combined with an umbrella, a lantern, an alarm, etc. that can be used only in an emergency other than a triangle that is not frequently used.

In accordance with a first embodiment of the present disclosure, there is provided a portable multi-purpose safety triangle including: a tripod including: a sign unit; and a support unit which supports the sign unit and is configured to be selectively set in one of a folded state and an unfolded state; and a frame including a frame body having an accommodation space for accommodating the tripod therein, and a frame cap selectively coupled to the frame body to open or close the accommodation space with respect to an outside, wherein the support unit includes: a first assistant support and a second assistant support that support the sign unit, the first assistant support and the second assistant support being adjustable in length; an elastic member whose both ends are respectively connected to the first assistant support and the second assistant support, the elastic member providing a restoring force to the first assistant support and the second assistant support such that an angle between the first assistant support and the second assistant support increases when the support unit is set in the folded state; and a main support that supports the elastic member, the main support being adjustable in length, wherein the sign unit includes a flexible material such that the size thereof is changed according to the state of the support unit, and the elastic member is configured such that an elastic force applied to the first assistant support and the second assistant support is at a minimum in the unfolded state and is at a maximum in the folded state.

The first assistant support may have a first rotary axis extending in a direction parallel with an extension direction of the first assistant support and is connected to the elastic member to be rotatable with respect to the first rotary axis, the second assistant support may have a second rotary axis extending in a direction parallel to an extension direction of the second assistant support and is connected to the elastic member to be rotatable with respect to the second rotary axis, and the sign unit may be configured to be wound on the first assistant support and the second assistant support when the first assistant support and the second assistant support are rotated about the first rotary axis and the second rotary axis, respectively.

The frame may further include a cradle having magnetism and connected to the frame body to be rotatable about a predetermined rotary axis provided at the frame body. The frame body may include one or more seat holes recessed in an outer surface of the frame body. The cradle may be inserted into the seat holes by being rotated to approach the outer surface of the frame body.

The portable multi-purpose safety triangle may further include a cover that surrounds the outer surface of the frame and has an anti-folding hole. The cradle may be configured to be changed between a setup state in which the cradle is spaced apart from the seat hole to be unfolded with respect to the frame body and a carried state in which the cradle is inserted in the seat hole. The anti-folding hole may be formed to surround at least a portion of the cradle to prevent the setup state from being released when the cradle is in the setup state.

The frame may further include a screw type support, which has a shape tapered such that a diameter of the upper portion is large and a diameter of the lower portion is small and which has elasticity, inside a lower portion of the frame. The frame body may include: an upper frame body having a bottom to which the screw type support is connected; and a lower frame body that has threads for coupling the screw type support, and the frame body is configured such that the upper frame body and the lower frame body are separated from each other by rotating one of the upper and lower frame bodies with respect to the other of the upper and lower frame bodies.

The sign unit may include a plurality of foldable wrinkles. The wrinkles may be extended when the support unit is in the unfolded state and the wrinkles are contracted when the support unit is in the folded state.

In accordance with a second embodiment of the present disclosure, there is provided a portable multi-purpose safety triangle including: a frame that includes a frame body having an accommodation space; an umbrella configured to be accommodated in the accommodation space; and a tripod, wherein the tripod includes: a sign unit including a flexible material; and a support unit which supports the sign unit and is configured to be selectively set in one of a folded state and an unfolded state, wherein the umbrella includes: a center rod that includes a connector supported by the frame body and a runner extending from an upper end of the connector; and a runner cap that is supported by an upper portion of the tripod and is selectively coupled to an upper end of the runner, wherein a runner space is formed inside the runner, and wherein the tripod is accommodated in the runner space when the runner cap is coupled to the runner.

In accordance with a third embodiment of the present disclosure, there is provided a portable multi-purpose safety triangle including: a frame including a frame body having an accommodation space; an umbrella configured to be accommodated in the accommodation space; and a tripod that includes a sign unit including a flexible material and an engaging piece configured to be engaged with the umbrella to be fixed to the umbrella, wherein the engaging piece has magnetism to be attached to at least a portion of the umbrella, wherein the umbrella includes a center rod including a connector supported by the frame body and a runner extending from an upper end of the connector, wherein a runner space for accommodating the tripod is formed inside the runner, and wherein the sign unit is supported by the umbrella while being unfolded outside the runner space when the engaging piece is engaged with the umbrella.

According to the embodiment of the present disclosure, a user who wants to set up the triangle can safely and easily set up the triangle.

Further, according to the embodiment of the present disclosure, a user can easily carry or stow the triangle.

Further, according to the embodiment of the present disclosure, it is possible to provide various functions.

DETAILED DESCRIPTION

Figure 1:
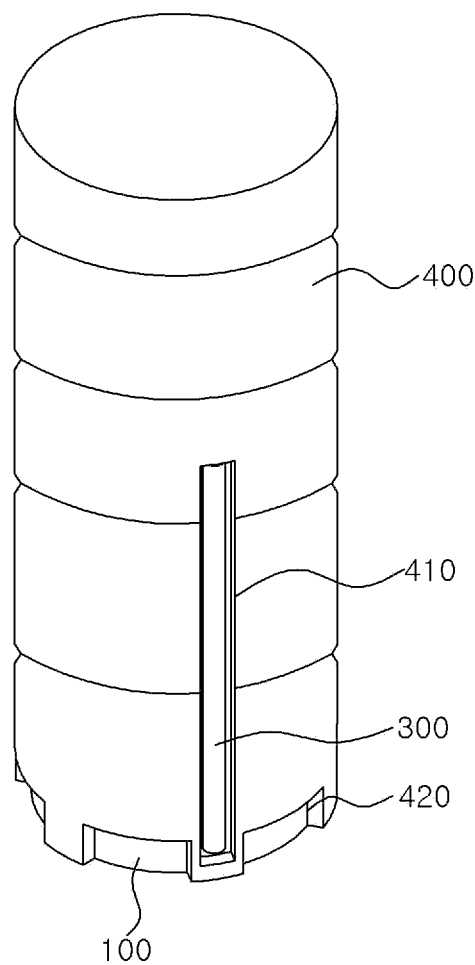
FIG. 1 is a perspective view of a portable multi-purpose safety triangle according to a first embodiment of the present disclosure.
Figure 2:
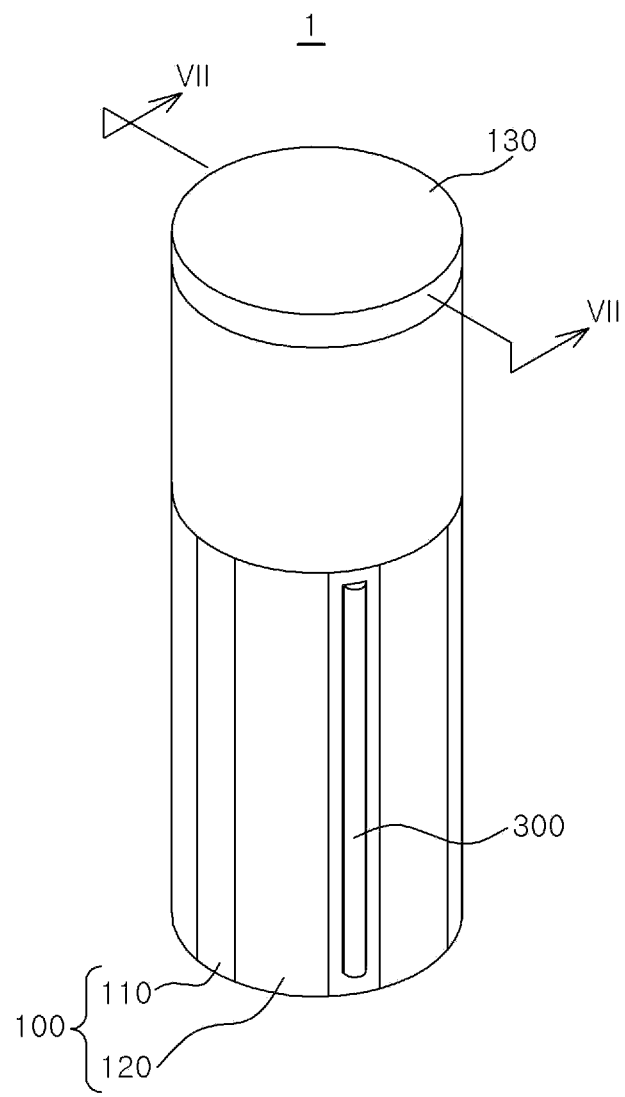
FIG. 2 is a perspective view of the portable multi-purpose safety triangle with a cover removed in FIG. 1.
Figure 3:
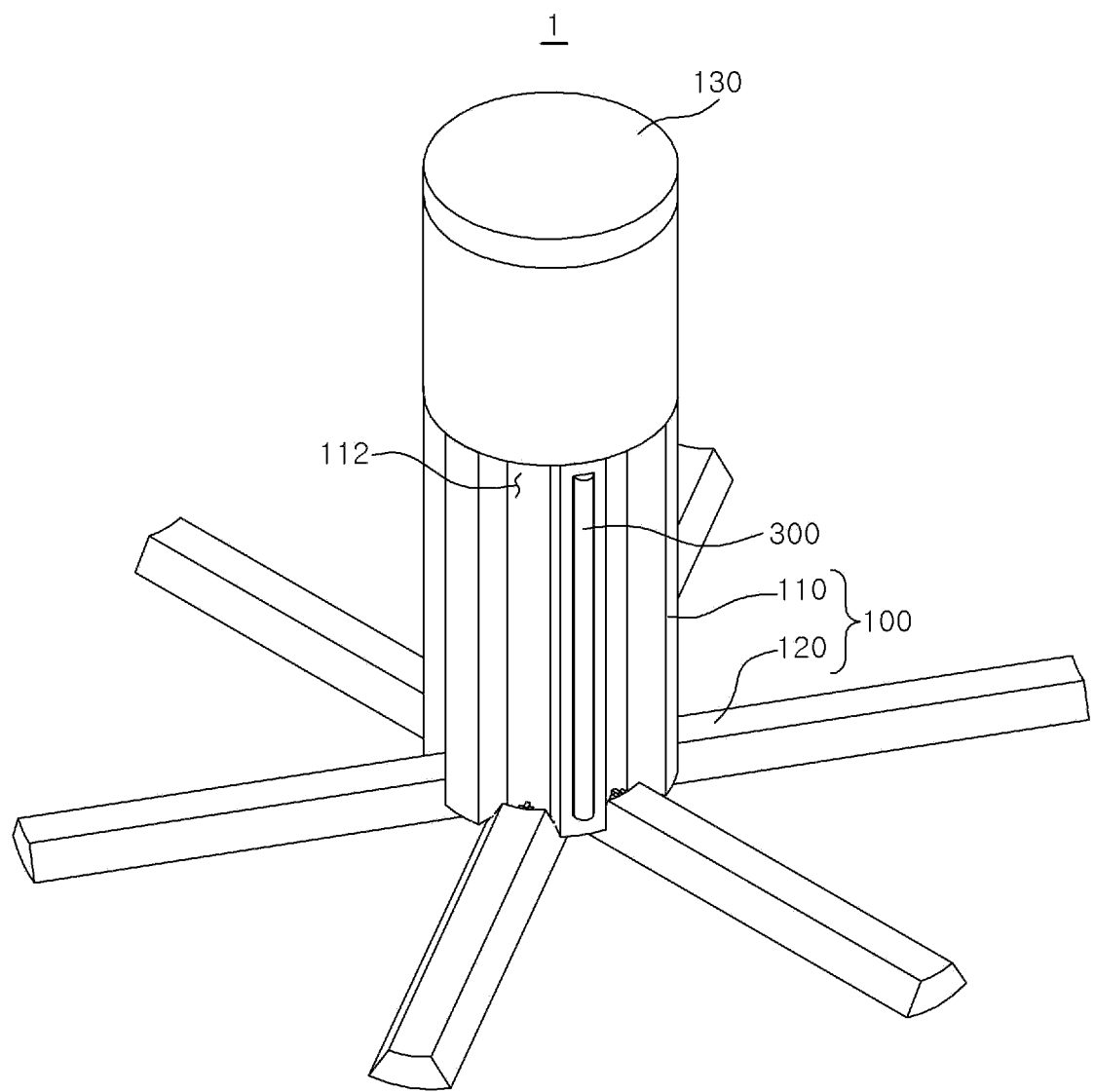
FIG. 3 is a perspective view showing the state in which a cradle of FIG. 2 is in a setup state.

Hereinafter, specific embodiments for implementing a spirit of the present disclosure will be described in detail with reference to the drawings.

In describing the present disclosure, detailed descriptions of known configurations or functions may be omitted to clarify the present disclosure.

When an element is referred to as being 'connected' to, 'supported' by, 'accessed' to, 'supplied' to, 'transferred' to, or 'contacted' with another element, it should be understood that the element may be directly connected to, supported by, accessed to, supplied to, transferred to, or contacted with another element, but that other elements may exist in the middle.

The terms used in the present disclosure are only used for describing specific embodiments, and are not intended to limit the present disclosure. Singular expressions include plural expressions unless the context clearly indicates otherwise.

Terms including ordinal numbers, such as first and second, may be used for describing various elements, but the corresponding elements are not limited by these terms. These terms are only used for the purpose of distinguishing one element from another element.

In the present specification, it is to be understood that the terms such as "including" are intended to indicate the existence of the certain features, areas, integers, steps, actions, elements, combinations, and/or groups thereof disclosed in the specification, and are not intended to preclude the possibility that one or more other certain features, areas, integers, steps, actions, elements, combinations, and/or groups thereof may exist or may be added.

Further, in the present disclosure, it is to be noted that expressions, such as the upper side and the lower side, are described based on the illustration of drawings, but may be modified if directions of corresponding objects are changed. The term 'up-down direction' in the specification may be the up-down direction in FIGS. 1 to 14.

Hereafter, the detailed configuration of a portable multi-purpose safety triangle 1 according to an embodiment of the present disclosure is described with reference to the drawings.

Hereafter, referring to FIGS. 1 to 7, a portable multi-purpose safety triangle 1 according to an embodiment of the present disclosure is disposed in a vehicle, so a driver can set up the portable multi-purpose safety triangle on the roof over the driver seat, etc. even without going outside, whereby it is possible to safely warn the drivers of other vehicles approaching the stopped vehicle. That is, the drivers of vehicles that are being driven can recognize a dangerous situation from a great distance through the portable multi-purpose safety triangle 1. The portable multi-purpose safety triangle 1 is configured to be carried by a user, so a user can easily carry the portable multi-purpose safety triangle 1. The portable multi-purpose safety triangle 1 may provide various functions. For example, the portable multi-purpose safety triangle 1 may provide a flashlight function, a light function, and a hazard image display function through hologram, whereby the preparation ratio in a vehicle can be increased. The portable multi-purpose safety triangle 1 may include a frame 100, a tripod 200, a light emitter 300, and a cover 400.

The frame 100 can support the tripod 200 and the light emitter 300. The frame 100 can accommodate the tripod 200. The frame 100 may include a frame body 110, a cradle 120, and a frame cap 130.

Referring to FIGS. 2 to 5, an accommodation space 111 in which the tripod 200 can be accommodated may be formed at the frame body 110. The accommodation space 111 may be formed through the frame body 110. The tripod 200 can be accommodated in the accommodation space 111. The frame body 110 may have a predetermined rotary axis for connection with the cradle 120. A seat hole 112 for seating the cradle 120 may be formed at the frame body 110. The seat hole 112 may be recessed on the outer surface of the frame body 110 and a plurality of seat holes 112 may be formed.

The cradle 120 can support the frame body 110 and can be installed on a vehicle, etc. The cradle 120 may be detachably attached to the body of a vehicle, and for example, may be made of a magnet. The cradle 120 may be rotatably connected to the frame body 110 through the rotary axis of the frame body 110. The cradle 120 may be in any one state of a setup state and a carried state. For example, when the cradle 120 is in the carried state, the cradle 120 is seated in the seat holes 112 and the volume of the frame 100 is minimum (see FIG. 2). When the cradle 120 is changed into the setup state, the cradle 120 is rotated away from the seat hole 112. In this case, the cradle 120 can be set up on a vehicle, etc. and can be stably fixed (see FIG. 3). A plurality of cradles 120 may be provided.

Since the cradle 120 is detachably attached to a vehicle, the cradle 120 can be easily set up or removed. When the cradle 120 is not set up, the volume is minimized, so carrying convenience can be improved.

Figure 7:
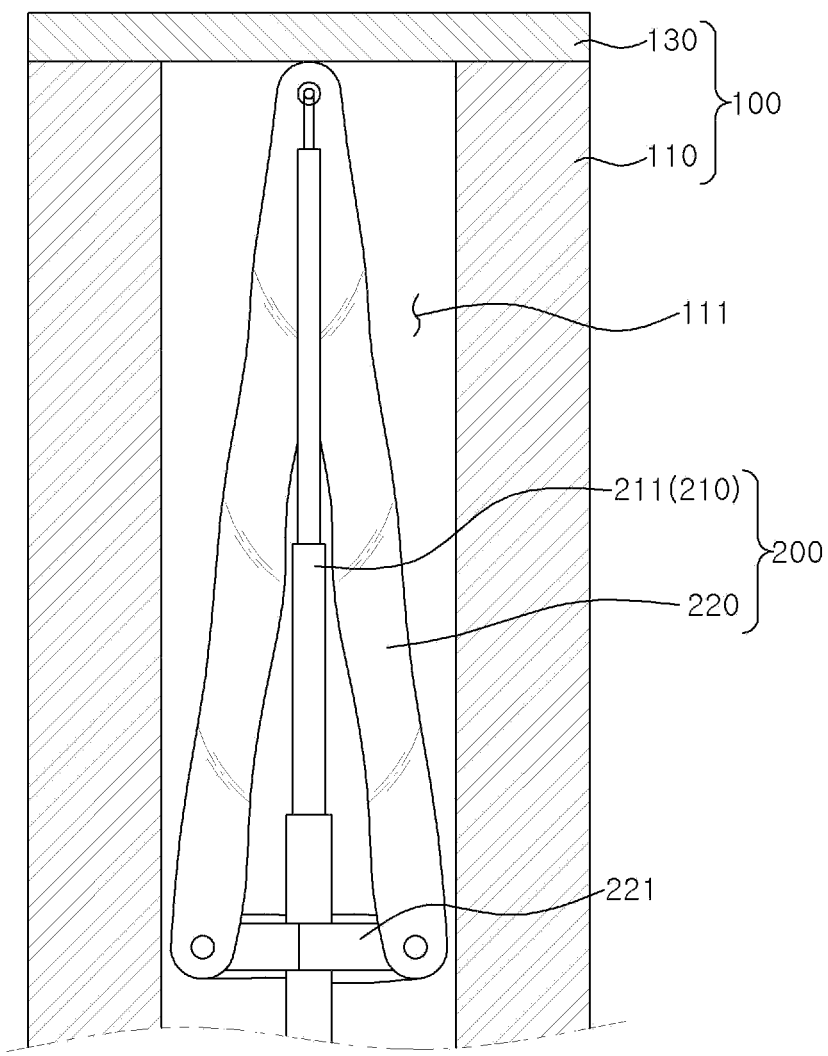
FIG. 7 is a cross-sectional view taken along line VII-VII of FIG. 2.
Figure 8:
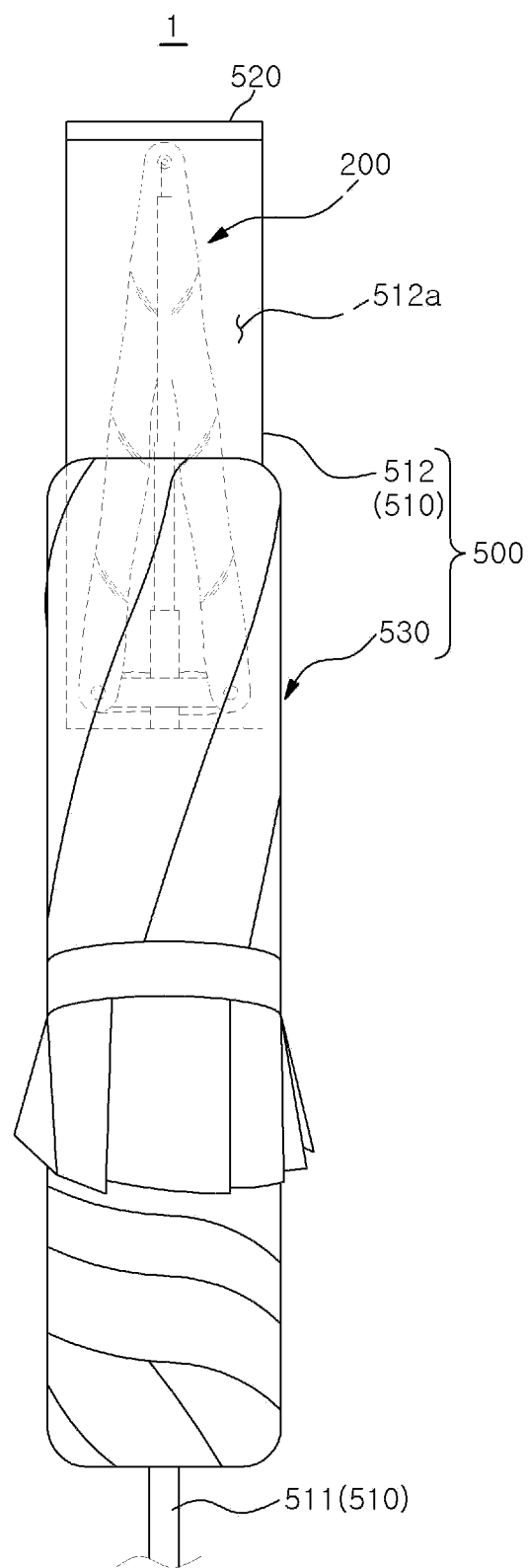
FIG. 8 is a view of a portable multi-purpose safety triangle according to a second embodiment of the present disclosure.
Figure 9:
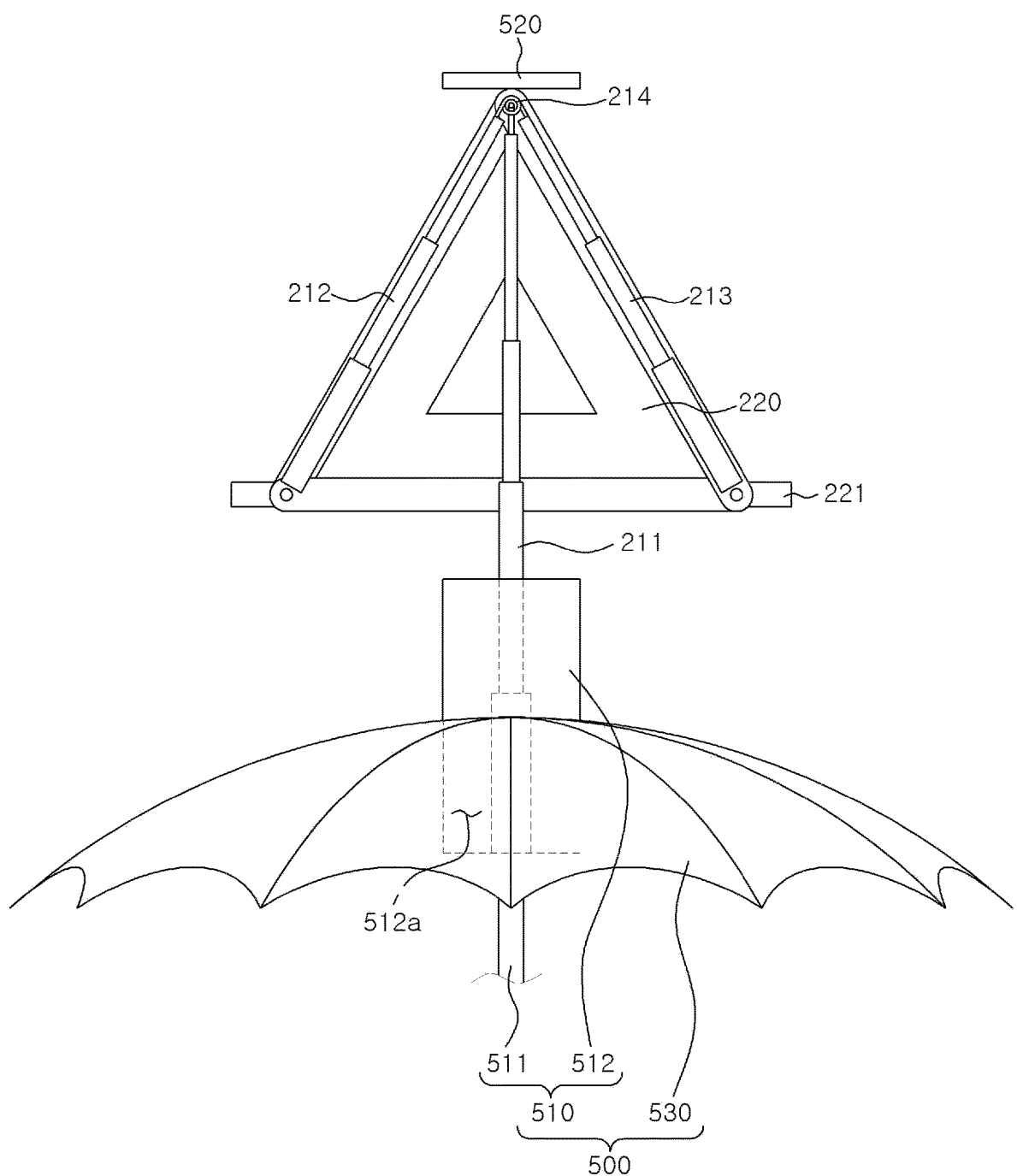
FIG. 9 is a view showing the state in which an umbrella of FIG. 8 is in an unfolded state and a tripod is in an unfolded state by being moved out of an accommodation space.
Figure 10:
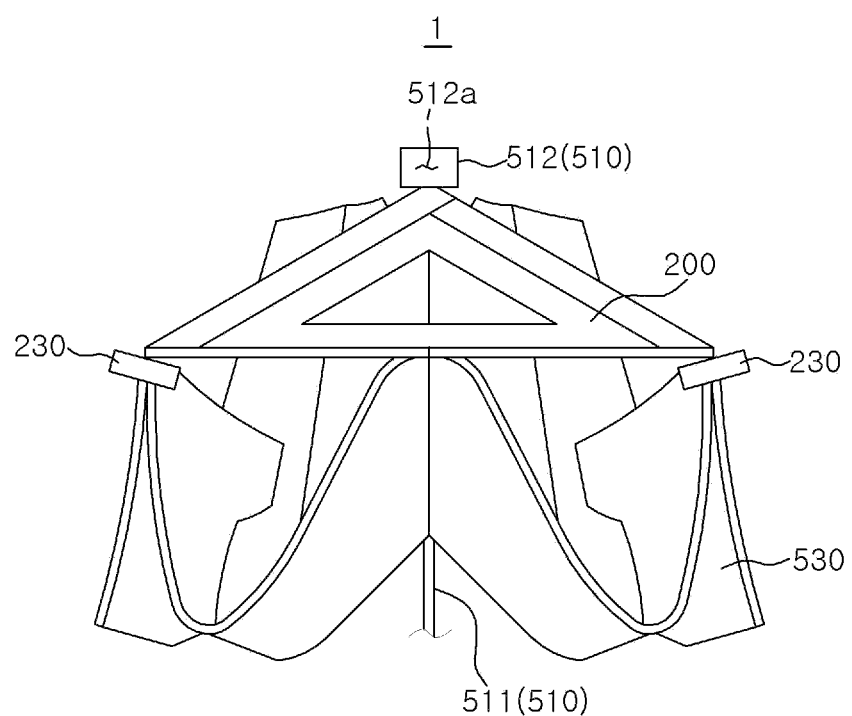
FIG. 10 is a partial view of a portable multi-purpose safety triangle according to a third embodiment of the present disclosure.
Figure 11:
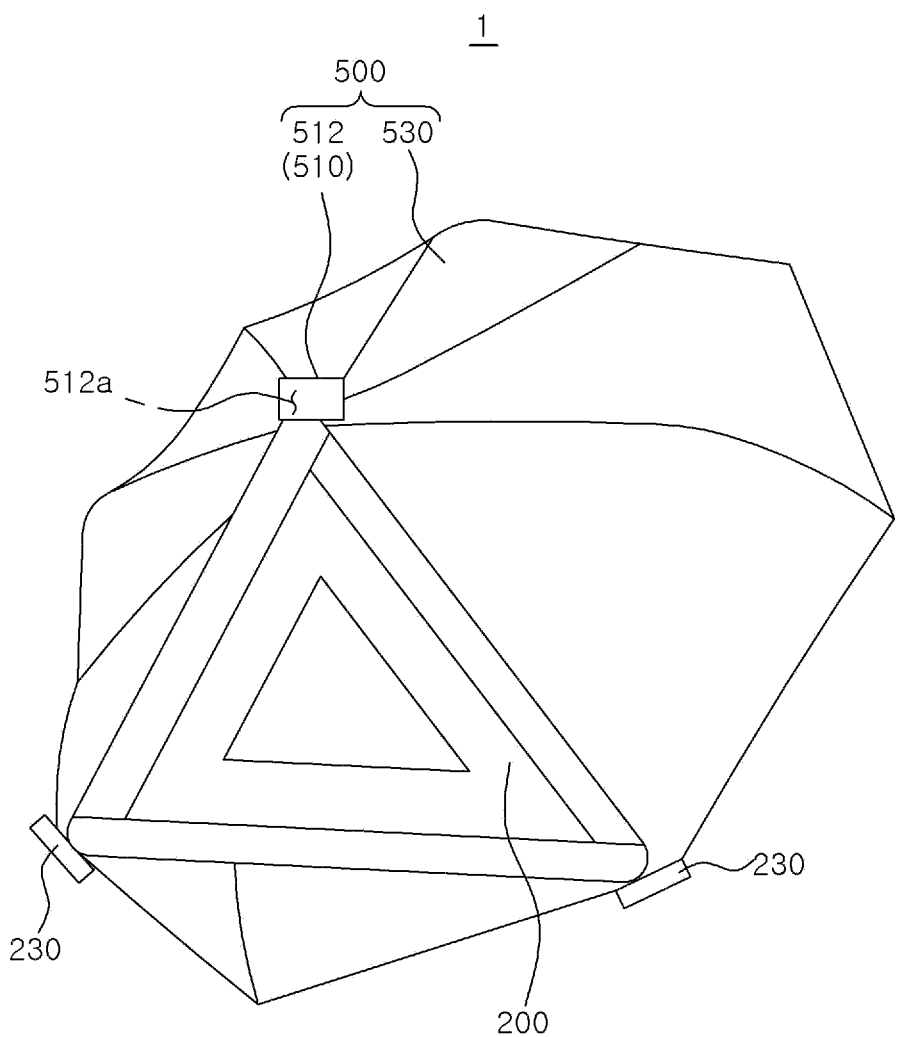
FIG. 11 is a view showing the state in which an umbrella of FIG. 10 is in an unfolded state.
Figure 12:
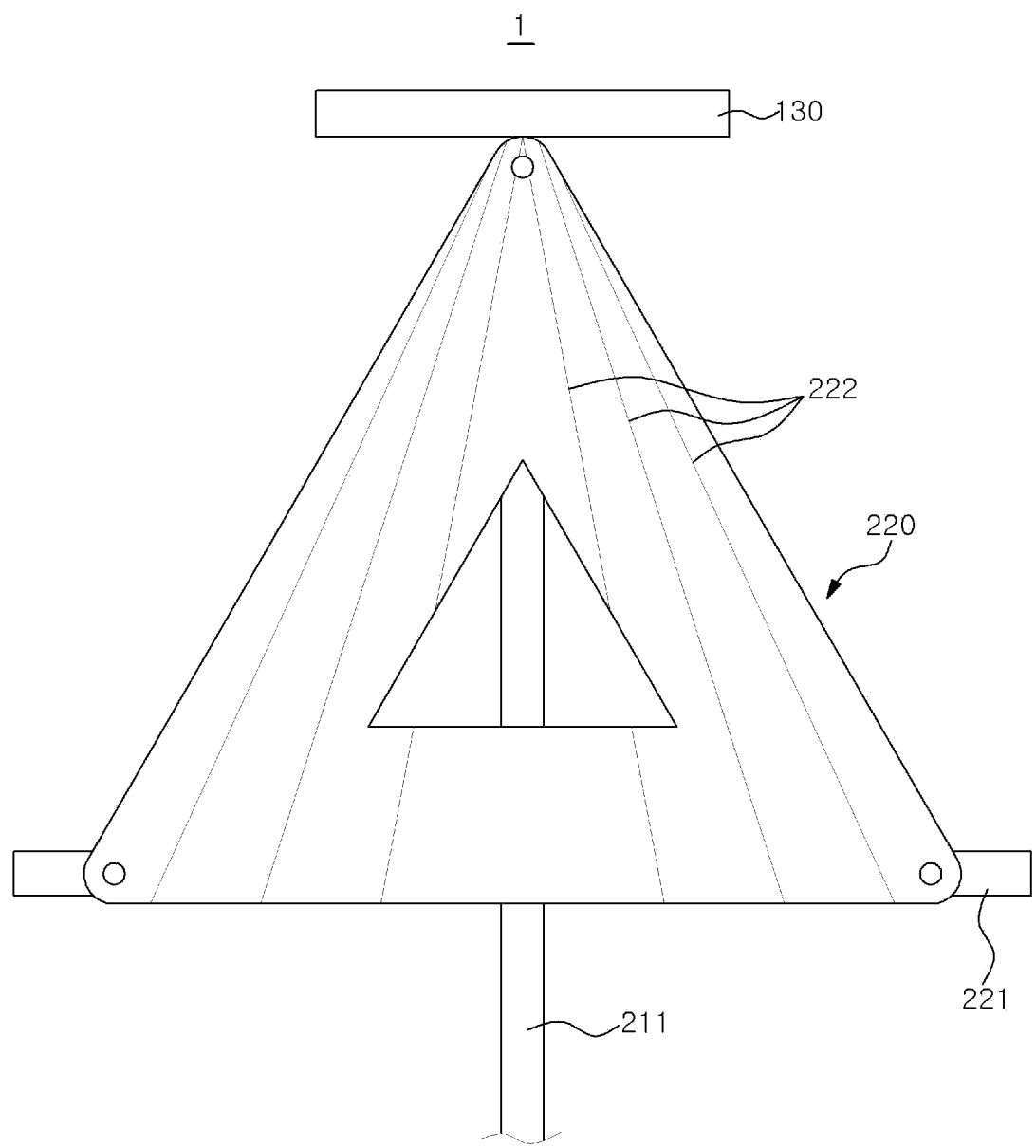
FIG. 12 is a view showing the state in which a sign unit according to a fourth embodiment of the present disclosure is in a folded state.
Figure 13:
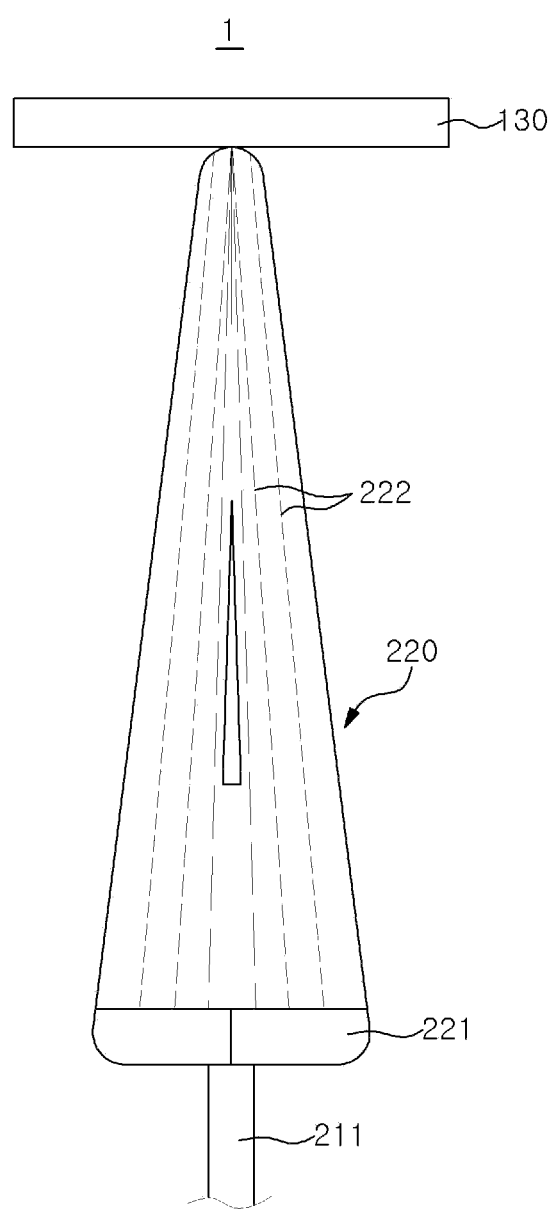
FIG. 13 is a view showing the state in which the sign unit of FIG. 12 is in a folded state.
Figure 14:
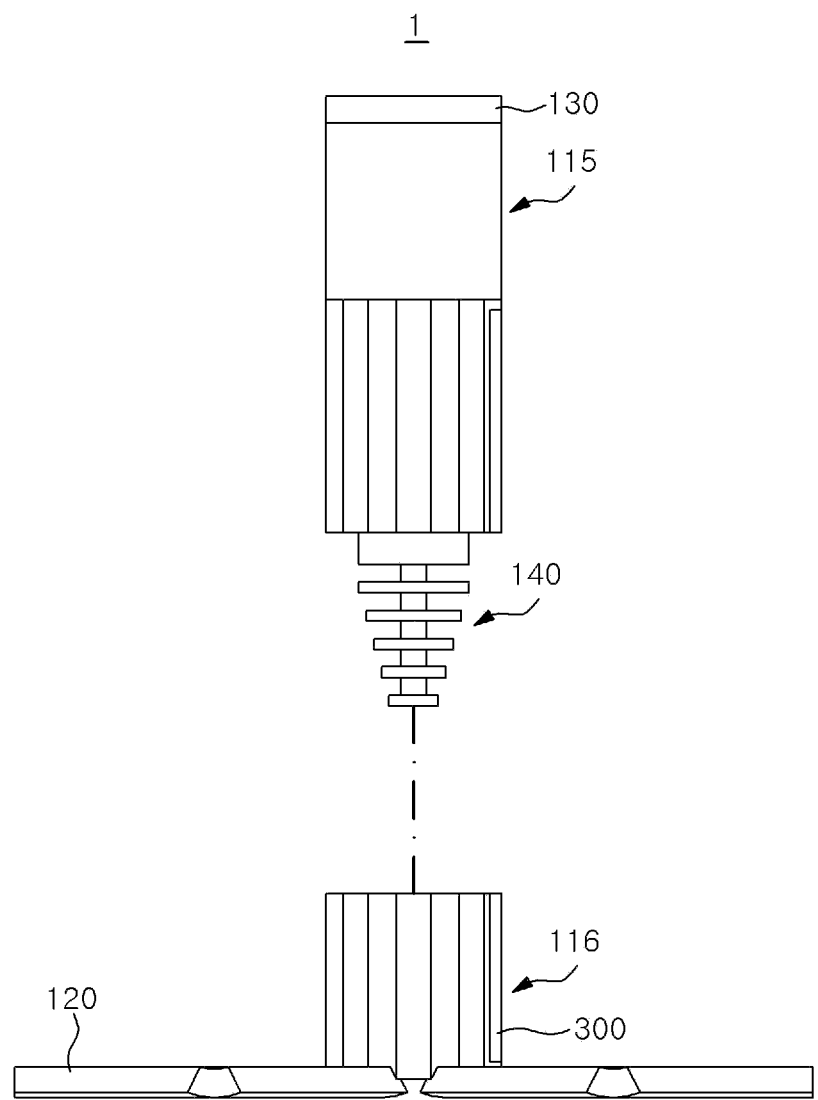
FIG. 14 is a front view showing the state in which a frame body according to a fifth embodiment of the present disclosure is divided into an upper frame body and a lower frame body by a screw type support.

The frame cap 130 is selectively coupled to the frame body 110 and can open/close the accommodation space 111 with respect to the outside. For example, when the frame cap 130 is separated from the frame body 110, the accommodation space 111 is opened to the outside. In this case, the tripod 200 may be changed into the unfolded state outside the accommodation space 111. Referring to FIG. 7, when the frame cap 130 is coupled to the frame body 110, the accommodation space 111 is closed to the outside. In this case, the tripod 200 is accommodated in the accommodation space 111 in the folded state.

The frame cap 130 is made of a noctilucent material or has a light emitting member therein, so it emits light toward the surroundings of the portable multi-purpose safety triangle 1 and the tripod 200 even if the surroundings of the portable multi-purpose safety triangle 1 is dark at night, whereby drivers can easily recognize the portable multi-purpose safety triangle 1.

For example, the frame cap 130 includes a frame cap member 131, a button type battery 133, a front bulb 134, and a rear bulb 135. The button type battery 133, the front bulb 134, and the rear bulb 135 may be accommodated in the frame cap member 131. The button type battery 133 may be disposed at the upper portion inside the frame cap member 131. The front bulb 134 and the rear bulb 135 may be disposed at the lower portion inside the frame cap member 131, and are connected to the button type battery 133, thereby being able to emit light using power from the button type battery 133. The front bulb 134 and the rear bulb 135 are disposed to emit light toward the lower side of the frame cap 130, thereby being able to irradiate the tripod 200 and the surroundings around the frame cap 130.

Figure 4:
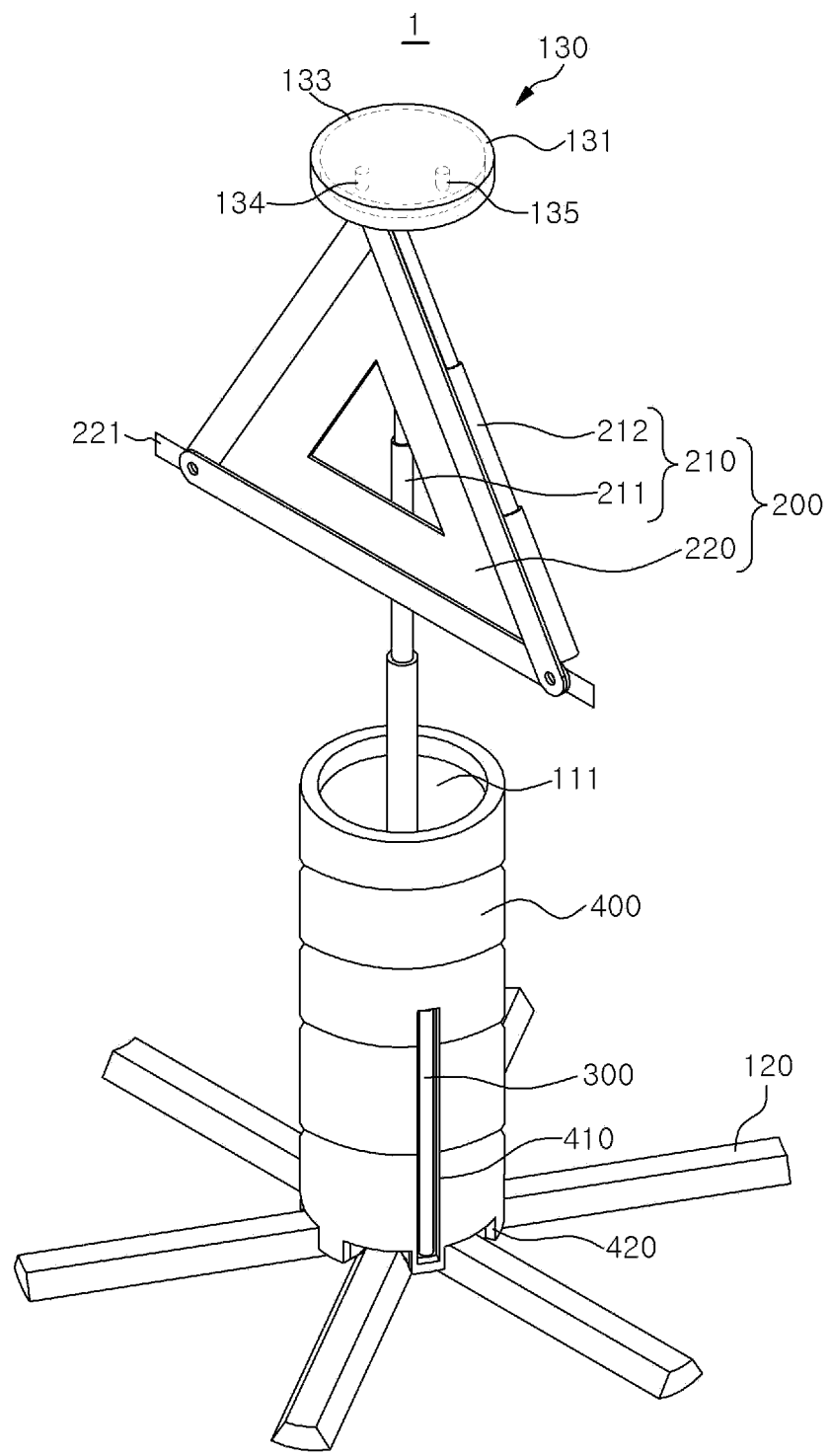
FIG. 4 is a perspective view showing the state in which a tripod of FIG. 1 is in an unfolded state by being moved out of an accommodation space.
Figure 5:
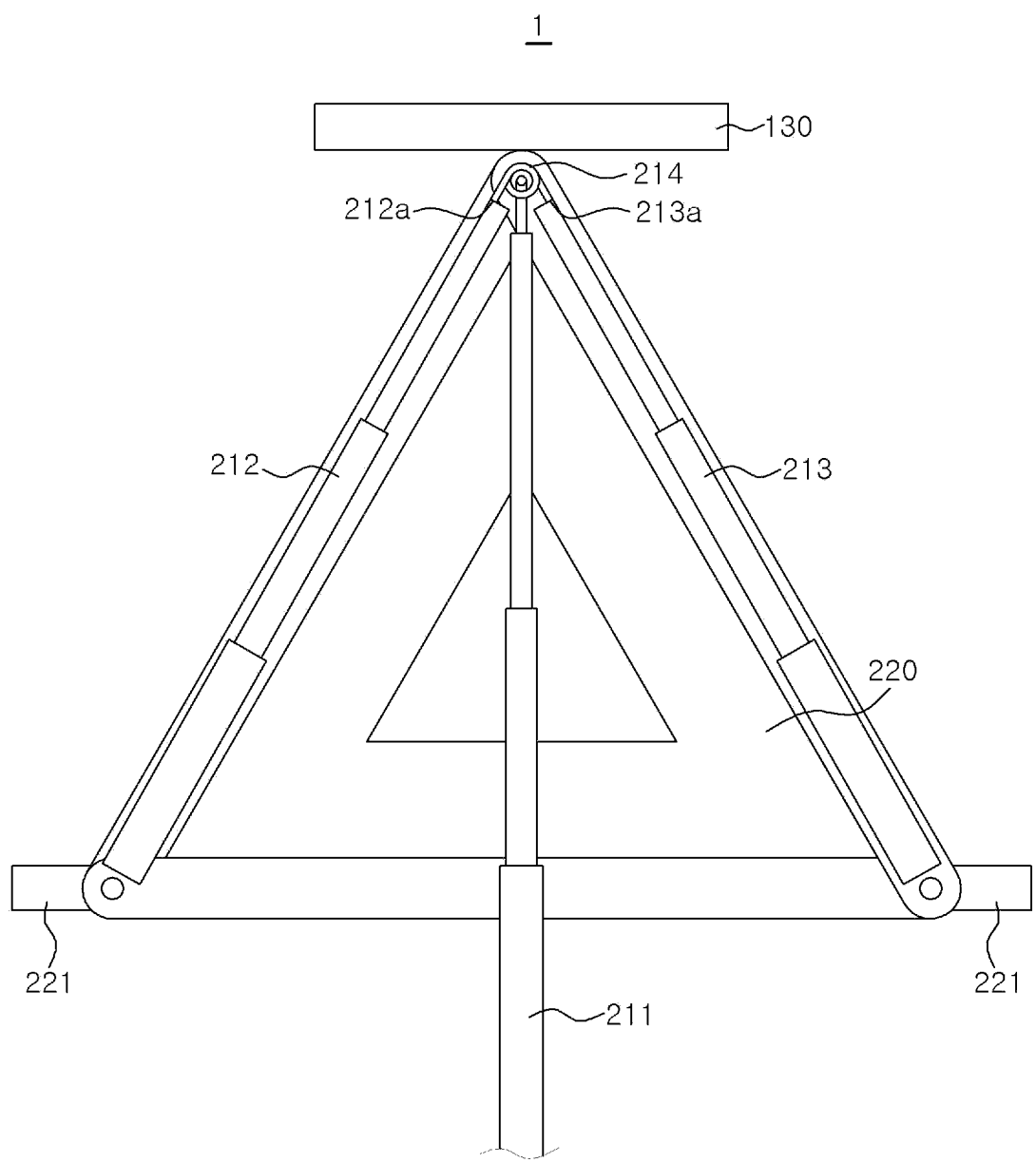
FIG. 5 is a partial rear view of FIG. 4.
Figure 6:
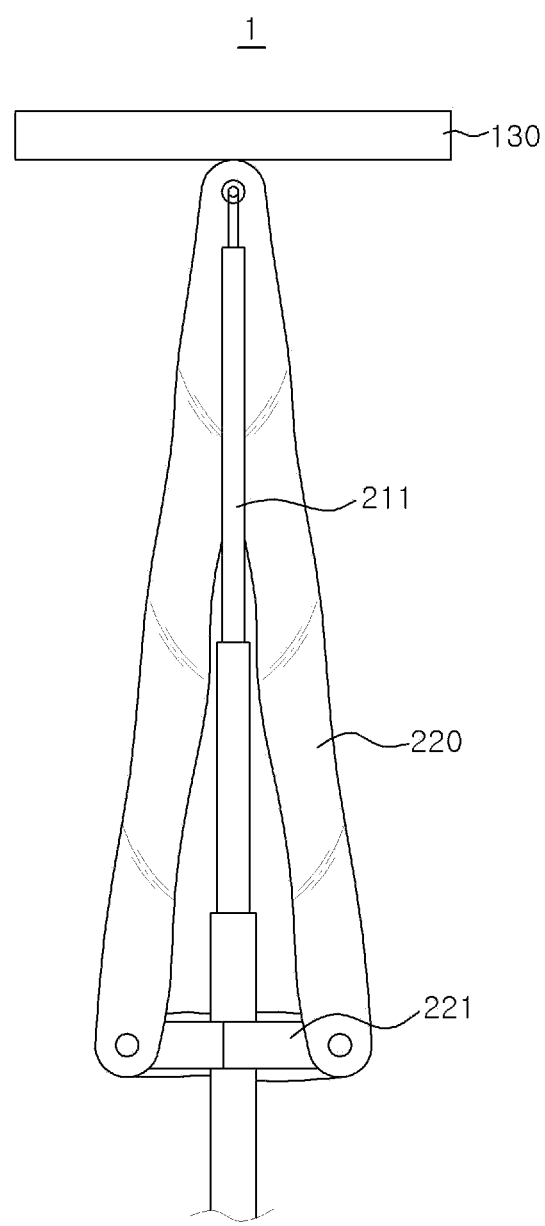
FIG. 6 is a view showing the state in which a cradle of FIG. 5 is in a folded state.

Referring to FIGS. 4 to 6, the tripod 200 may make a driver recognize a possibility of an accident. The tripod 200, if necessary, is selectively inserted into the accommodation space 111. The tripod 200 may include a support unit 210 and a sign unit 220.

The support unit 210 can support the sign unit 220. The support unit 210 may be in any one state of a folded state and an unfolded state. The folded state and unfolded state will be described below. The support unit 210 may include a main support 211, a first assistant support 212, a second assistant support 213, and an elastic member 214.

The main support 211 can support the first assistant support 212, the second assistant support 213, and the elastic member 214. One end of the main support 211 may be supported by the frame 110 and the other end thereof may support the elastic member 214. The main support 211 may be configured such that the length thereof can be adjusted. For example, the main support 211 may be a telescope type antenna. The main support 211 may be stretched outward from the accommodation space 111 by a switch (not shown). However, this is only an example, and the main support 211, the first assistant support 212, and the second assistant support 213 may be well-known members that can adjust the size and height of the sign unit 220 because the lengths thereof can be adjusted.

The first assistant support 212 is rotatably connected to the elastic member 214. The first assistant support 212 has a first rotary axis 212*a* extending in a direction that is parallel with the extension direction of the first assistant support 212, that is, the longitudinal direction of the first assistant support 212. The first assistant support 212 can be rotated about the first rotary axis 212*a*. For example, when the first assistant support 212 is rotated about the first rotary axis 212*a*, the sign unit 220 can be wound on the first assistant support 212.

The second assistant support 213 is rotatably connected to the elastic member 214. The second assistant support 213 has a second rotary axis 213*a* extending in the extension direction of the second assistant support 213, that is, in a direction parallel with the longitudinal direction of the second assistant support 213. The second assistant support 213 can be rotated about the second rotary axis 213*a*. For example, when the second assistant support 213 is rotated about the second rotary axis 213*a*, the sign unit 220 can be wound on the second assistant support 213.

The first assistant support 212 and the second assistant support 213 may be connected to the elastic member 214 at both sides of the main support 211. The first assistant support 212 and the second assistant support 213 may be configured such that the contained angle that is the angle between the first assistant support 212 and the second assistant support 213. For example, when the first assistant support 212 and the second assistant support 213 is in the folded state, the contained angle is at a minimum. When the first assistant support 212 and the second assistant support 213 is in the unfolded state, the contained angle is at a maximum. For example, when the support unit 210 is inserted in the accommodation space 111 in the folded state, the first assistant support 212 and the second assistant support 213 are supported by the frame body 110. The support unit 210 can be maintained in the folded state by the frame body 110.

As another example, when the main body 211 is stretched out of the accommodation space 111, the first assistant support 212 and the second assistant support 213 can be changed into the unfolded state by the elastic member 214. The first assistant support 212 and the second assistant support 213 may be configured such that the lengths thereof can be adjusted. For example, the first assistant support 212 and the second assistant support 213 may be telescope type antennas.

The elastic member 214 may provide a restoring force to the first assistant support 212 and the second assistant support 213. The elastic member 214 is configured such that the elastic force applied to the first assistant support 212 and the second assistant support 213 is at a minimum in the unfolded state and is at a maximum in the folded state. For example, when the first assistant support 212 and the second assistant support 213 is in the folded state, the elastic member 214 can provide a return force to the first assistant support 212 and the second assistant support 213 such that the contained angle increases. The elastic member 214 may have one end connected with the first assistant support 212 and the other end connected with the second assistant support 213. For example, the elastic member 214 may be a torsion spring. The elastic member 214 can be supported by the main support 211.

The sign unit 220 may notify a vehicle driver of the risk of an accident. The sign unit 220 may have a color that is conspicuous to the vehicle driver. The sign unit 220 may be applied with a noctilucent substance to be seen well even at night. The sign unit 220 may include an elastic material to be wound on the first assistant support 212 and the second assistant support 213. For example, the sign unit 220 may include an elastic fiber. A strip 221 may be provided at the sign unit 220.

Referring to FIG. 6 again, the strip 221 may prevent the sign unit 220 from being unwound when the sign unit 220 is wound on the first assistant support 212 and the second assistant support 213. For example, the strip 221 may be implemented by Velcro, a button, a snap, etc.

Referring to FIGS. 1 to 4, the light emitter 300 may emit light toward the outside. The light emitter 300 may be fixedly supported on the outer surface of the frame 110 and may be exposed to the outside through a cover hole 410 of the cover 400 to be described later. The light emitter 300 may irradiate the surroundings of the tripod 200 by emitting light toward the side of the frame 100. For example, the light emitter 300 may be a well-known device that may emit light, such as a lantern. Although the light emitter 300 is described herein as one member attached to the side of the frame, it is only an example and the present disclosure is not limited thereto. Accordingly, a plurality of light emitters 300 may be provided. Any one of the light emitters 300 may be disposed in the accommodation space 111 and may emit light upward and the light emitter 300 disposed inside the frame cap 130 may emit light downward. That is, another light emitter 300 may emit light toward the tripod 200.

A user may use the light emitter 300 as a portable flashlight with the tripod 200 maintained in the folded state.

As described above, the light emitters 300 emit light toward the surroundings of the portable multi-purpose safety triangle 1 and the tripod 200 even if the surroundings of the portable multi-purpose safety triangle 1 is dark, whereby drivers can easily recognize the portable multi-purpose safety triangle 1. Accordingly, it is possible to prevent an accident due to a driver who does not recognize the portable multi-purpose safety triangle 1.

The cover 400 may be provided to cover the outer surface of the frame 100 and may be extended and contracted along the frame 100. For example, when the cover 400 may be rotated so that the cradle 120 is placed in the setup state, the cover 400 may be contracted upward so as not to interfere with the cradle 120. After that, when the cradle 120 is placed in the setup state, it may be extended downward. The cover 400, for example, may include a silicone material. The cover 400 may have a plurality of convex portions to come better in close contact with the outer surface of the frame 100. A cover hole 410 may be formed at the cover 400 so that the light emitter 300 may be exposed to the outside. The light emitted from the light emitter 300 may travel outside through the cover hole 410.

An anti-folding hole 420 that may prevent the cradle 120 from folding may be formed at the cover 400. The anti-folding hole 420 may prevent the setup state from being removed when the cradle 120 is in the setup state. For example, the anti-folding hole 420 is provided to surround a portion of the cradle 120 that is in the setup state and interferes with the upper portion of the cradle 120 (see FIG. 4). In this case, rotation of the cradle 120 can be prevented by the anti-folding hole 420. The cradle 120 may be set up more stably on a vehicle, etc., and may support the frame 100.

Other than this configuration, according to a second embodiment of the present disclosure, the portable multi-purpose safety triangle may further include an umbrella 500. Hereafter, the second embodiment of the present disclosure is described in more detail with reference to FIGS. 8 and 9. The difference of the second embodiment from the previous embodiment is mainly described, and the previous embodiment is referred to for the same description and reference numerals.

The umbrella 500 may protect the user holding the portable multi-purpose safety triangle 1 from rain, and may be used in rainy weather in addition to the triangle with less frequency of use. Accordingly, the preparation ratio in a vehicle for a driver may be increased and the height of the cradle for the tripod 200 may be increased.

The umbrella 500 may be unfolded or folded by a switch (not shown), and the configuration of folding and unfolding the umbrella 500 is well known in the art, so it is not described in detail. The umbrella 500 may include a center rod 510, a runner cap 520, and a canopy 530.

The center rod 510 may be supported by the frame 100 and may support the tripod 200. The center rod 510 may include a connector 511 and a runner 512.

The connector 511 is supported by the frame body 110 and may extend in the up-down direction. The connector 511 may support the canopy 530.

The runner 512 extends from the upper end of the connector 511. A runner space 512a may be formed inside the runner 512. The tripod 200 may be accommodated in the runner space 512a.

The runner cap 520 may be selectively coupled to the upper end of the runner 512. The runner cap 520 may be supported by the top of the tripod 200. For example, the runner cap 520 may be supported by the top of the tripod 200 and coupled to the upper end of the runner 512. When the runner cap 520 is coupled to the upper end of the runner 512, the tripod 200 is accommodated in the runner space 512a.

When the runner cap 520 is separated from the runner 512, the tripod 200 may be discharged out of the runner space 512a and may be unfolded outside the runner space 512a.

The canopy 530 may protect the user holding the portable multi-purpose safety triangle 1 from rain.

Other than this configuration, according to a third embodiment of the present disclosure, the tripod 200 may include engaging pieces 230. Hereafter, the third embodiment of the present disclosure is described in more detail with reference to FIGS. 10 and 11. The difference of the third embodiment from the previous embodiments is mainly described, and the previous embodiments are referred to for the same description and reference numerals.

The tripod 200 may be accommodated in the runner space 512a, and if necessary, may be discharged out of the runner space 512a. The tripod 200 may be unfolded or folded in correspondence to the shape of the umbrella 500 when the umbrella 500 is unfolded or folded. The upper end of the tripod 200 is connected with the runner cap 520 and may include the engaging pieces 230 connected by a knot, etc. at the ends of both sides.

The engaging pieces 230 may be engaged with the umbrella 500 through holes so that both sides of the sign unit 220 are fixed to the umbrella 500. A plurality of engaging pieces 230 may be provided. The engaging pieces 230 may have magnetism to be attached to at least a portion of the umbrella 500. That is, the engaging pieces 230 are attached and engaged to the ribs of the umbrella 500 by magnetism, thereby being able to be fixed to the umbrella 500.

The engaging pieces 230 may be attached to each other to accommodate the sign unit 220 in the runner space 512a. That is, when the engaging pieces 230 are fixed to each other with the sign unit 220 wound, the sign unit 220 may be fixed and accommodated in the runner space 512a. The sign unit 220 may be used by detaching the engaging pieces 230 after discharged outside.

The sign unit 220 may be folded outside the runner space 512a and supported by the umbrella 500 when the engaging pieces 230 are engaged with the umbrella 500.

Other than this configuration, according to a fourth embodiment of the present disclosure, the sign unit 220 may include wrinkles 222. Hereafter, the fourth embodiment of the present disclosure is described in more detail with reference to FIGS. 12 and 13. The difference of the fourth embodiment from the previous embodiments is mainly described, and the previous embodiments are referred to for the same description and reference numerals.

The sign unit 220 may include a plurality of wrinkles 222. The wrinkles 222 may be folded or unfolded, depending on the state of the support unit 210. For example, the wrinkles 222 may be configured to be stretched when the support 210 is in the unfolded state, and to be contracted when the support 210 is in the folded state. The sign unit 220 may be stretched and contracted in correspondence to the state of the support unit 210, as described above.

Other than this configuration, according to a fifth embodiment of the present disclosure, the frame 100 may further include a screw type support 140. Hereafter, the fifth embodiment of the present disclosure is described with reference to FIG. 14.

The frame body 110 may include an upper frame body 115 and a lower frame body 116.

An accommodation space 111 in which a tripod 200 is accommodated may be formed at the upper frame body 115. The screw type support 140 may be connected to the bottom of the upper frame body 115.

The lower frame body 116 may support the upper frame body 115. Thread (not shown) that may be engaged with the screw type support 140 may be formed at the lower frame body 116.

The screw type support 140 may have a shape tapered such that the diameter thereof decreases as goes downward. The frame body 110 may be divided into the upper frame body 115 and the lower frame body 116 by the screw type support 140. For example, the upper frame body 115 and the lower frame body 116 may be separated from each other by rotating any one of them with respect to the other one. The divided upper frame body 115 may be connected to the upper portion of a specific object and the lower frame body 116 may be connected to the lower portion of the lower frame body 116. For example, the object may be a bottle, an umbrella, etc.

When an object is connected between the upper frame body 115 and the lower frame body 116, as described above, there is an effect of increasing the length of the frame body 110, and the sign unit 220 may be recognized further in the distance.

As described above, the portable multi-purpose safety triangles 1 according to the first to fifth embodiment of the present disclosure may be prepared adjacent to a driver seat, so there is an effect that a driver who wants to set up the portable multi-purpose safety triangles 1 may safely and easily set it up.

A high-elastic member such as spandex that has 5-times to 8-times flexibility is used as the material of the sign unit 220 so that the portable multi-purpose safety triangle 1 may be decreased in size to 1/5 to 1/8 of the sizes of triangles of the related art. Accordingly, it is possible to easily carry or stow the portable multi-purpose safety triangle 1 and the portable multi-purpose safety triangle 1 may be further decreased in size if a more flexible new material is developed.

The tripod 200 may be inserted in the frame body 110 only for a small triangle and stowed in the console box of a vehicle, etc., and may be combined with a spare umbrella 500, inserted in an extended center rod 510, and stowed in a vehicle.

When the portable multi-purpose safety triangle 1 is used, the flexible small sign unit 220 is used in a 5-time to 8-time large size by unfolding the antenna type support unit 210 or unfolding the umbrella rib type support unit 210, whereby it is possible to adjust the size of the triangle.

The examples of the present disclosure have been described above as specific embodiments, but these are only examples, and the present disclosure is not limited thereto, and should be construed as having the widest scope according to the technical spirit disclosed in the present specification. A person skilled in the art may combine/substitute the disclosed embodiments to implement a pattern of a shape that is not disclosed, but it also does not depart from the scope of the present disclosure. In addition, those skilled in the art may easily change or modify the disclosed embodiments based on the present specification, and it is clear that such changes or modifications also belong to the scope of the present disclosure.

What is claimed is:

1. A portable multi-purpose safety triangle, comprising:
a tripod including a sign unit and a support unit which supports the sign unit and is configured to be selectively set in one of a folded state and an unfolded state; and
a frame including a frame body having an accommodation space for accommodating the tripod therein, and a frame cap selectively coupled to the frame body to open or close the accommodation space with respect to an outside, wherein the support unit includes:
a first assistant support and a second assistant support that support the sign unit, the first assistant support and the second assistant support being adjustable in length;
an elastic member whose both ends are respectively connected to the first assistant support and the second assistant support, the elastic member providing a restoring force to the first assistant support and the second assistant support such that an angle between the first assistant support and the second assistant support increases when the support unit is set in the folded state; and
a main support that supports the elastic member, the main support being adjustable in length,
wherein the sign unit includes a flexible material such that the size thereof is changed according to the state of the support unit, and
the elastic member is configured such that an elastic force applied to the first assistant support and the second assistant support is at a minimum in the unfolded state and is at a maximum in the folded state.

2. The portable multi-purpose safety triangle of claim 1, wherein the first assistant support has a first rotary axis extending in a direction parallel with an extension direction of the first assistant support and is connected the elastic member to be rotatable with respect to the first rotary axis,
the second assistant support has a second rotary axis extending in a direction parallel to an extension direction of the second assistant support and is connected to the elastic member to be rotatable with respect to the second rotary axis, and
the sign unit is configured to be wound on the first assistant support and the second assistant support when the first assistant support and the second assistant support are rotated about the first rotary axis and the second rotary axis, respectively.

3. The portable multi-purpose safety triangle of claim 1, wherein the frame further includes a screw type support which has a shape tapered such that a diameter of the upper portion is large and a diameter of the lower portion is small and which has elasticity, inside a lower portion of the frame,
wherein the frame body includes:
an upper frame body having a bottom to which the screw type support is connected; and
a lower frame body that has threads for coupling the screw type support, and
wherein the frame body is configured such that the upper frame body and the lower frame body are separated from each other by rotating one of the upper and lower frame bodies with respect to the other of the upper and lower frame bodies.

4. The portable multi-purpose safety triangle of claim 1, wherein the sign unit includes a plurality of foldable wrinkles, and
wherein the wrinkles are extended when the support unit is in the unfolded state and the wrinkles are contracted when the support unit is in the folded state.

5. The portable multi-purpose safety triangle of claim 1, wherein the frame further includes a cradle having magnetism and connected to the frame body to be rotatable about a predetermined rotary axis provided at the frame body,
wherein the frame body includes one or more seat holes recessed in an outer surface of the frame body, and
wherein the cradle is inserted into the seat holes by being rotated to approach the outer surface of the frame body.

6. The portable multi-purpose safety triangle of claim 3, further comprising a cover that surrounds the outer surface of the frame and has an anti-folding hole,
wherein the cradle is configured to be changed between a setup state in which the cradle is spaced apart from the seat hole to be unfolded with respect to the frame body and a carried state in which the cradle is inserted in the seat hole, and
wherein the anti-folding hole is formed to surround at least a portion of the cradle to prevent the setup state from being released when the cradle is in the setup state.

7. A portable multi-purpose safety triangle, comprising:
a frame that includes a frame body having an accommodation space;
an umbrella configured to be accommodated in the accommodation space; and
a tripod,
wherein the tripod includes:
a sign unit including a flexible material; and
a support unit which supports the sign unit and is configured to be selectively set in one of a folded state and an unfolded state,
wherein the umbrella includes:
a center rod that includes a connector supported by the frame body and a runner extending from an upper end of the connector; and
a runner cap that is supported by an upper portion of the tripod and is selectively coupled to an upper end of the runner,
wherein a runner space is formed inside the runner, and
wherein the tripod is accommodated in the runner space when the runner cap is coupled to the runner.

8. A portable multi-purpose safety triangle, comprising:
a frame including a frame body having an accommodation space;
an umbrella configured to be accommodated in the accommodation space; and
a tripod that includes a sign unit including a flexible material and an engaging piece configured to be engaged with the umbrella to be fixed to the umbrella,
wherein the engaging piece has magnetism to be attached to at least a portion of the umbrella,
wherein the umbrella includes a center rod including a connector supported by the frame body and a runner extending from an upper end of the connector,
wherein a runner space for accommodating the tripod is formed inside the runner, and
wherein the sign unit is supported by the umbrella while being unfolded outside the runner space when the engaging piece is engaged with the umbrella.

* * * * *